(12) United States Patent
Pasch

(10) Patent No.: US 6,402,188 B1
(45) Date of Patent: Jun. 11, 2002

(54) RETAINING DEVICE FOR A PANELING ELEMENT COVERING AN AIRBAG ARRANGEMENT

(75) Inventor: Marcus Pasch, Müden/Aller (DE)

(73) Assignee: Volkswagen (DE)

( * ) Notice: Subject to any disclaimer, the term of this patent is extended or adjusted under 35 U.S.C. 154(b) by 0 days.

(21) Appl. No.: 09/720,097

(22) PCT Filed: Jun. 7, 1999

(86) PCT No.: PCT/EP99/03914

§ 371 (c)(1),
(2), (4) Date: Apr. 30, 2001

(87) PCT Pub. No.: WO99/67109

PCT Pub. Date: Dec. 29, 1999

(30) Foreign Application Priority Data

Jun. 24, 1998 (DE) .......................... 198 28 163

(51) Int. Cl.⁷ .......................... B60R 21/16; B60R 21/20; B60R 21/18
(52) U.S. Cl. .............................. 280/728.2; 280/728.1; 280/728.3; 280/730.2; 280/733
(58) Field of Search .......................... 280/728.3, 728.2, 280/743.2, 730.2, 733, 743.1, 728.1; B60R 21/20

(56) References Cited

U.S. PATENT DOCUMENTS

| | | | |
|---|---|---|---|
| 5,398,960 A | * 3/1995 | Ravenberg et al. | 280/728.3 |
| 5,403,034 A | * 4/1995 | Gans et al. | 280/728.3 |
| 5,458,365 A | * 10/1995 | Rogers et al. | 280/728.3 |
| 5,496,060 A | * 3/1996 | Whited et al. | 280/728.3 |
| 5,584,502 A | * 12/1996 | Phillion et al. | 280/728.3 |
| 5,590,903 A | * 1/1997 | Phillion et al. | 280/728.3 |
| 5,613,701 A | * 3/1997 | Bentley et al. | 280/728.3 |
| 5,651,562 A | * 7/1997 | Hagen et al. | 280/728.3 |
| 6,053,527 A | * 4/2000 | Gans et al. | 280/728.3 |
| 6,145,870 A | * 11/2000 | Devane et al. | 280/728.2 |
| 6,206,408 B1 | * 3/2001 | Schneider | 280/728.1 |

FOREIGN PATENT DOCUMENTS

| | | | | |
|---|---|---|---|---|
| DE | 43 15 853 A1 | 11/1994 | | |
| EP | 0 415 362 A2 | 3/1991 | | |
| EP | 0695671 A1 | * 2/1996 | | B60R/21/20 |
| EP | 0873916 A1 | * 10/1998 | | B60R/21/20 |

* cited by examiner

Primary Examiner—Brian L. Johnson
Assistant Examiner—Joselynn Y. Sliteris
(74) Attorney, Agent, or Firm—McNair Law Firm, P.A.

(57) ABSTRACT

A retaining device for a panel element of the interior paneling of a motor vehicle which covers the airbag arrangement so that paneling and holding element that may come loose when the airbag unfurls are restrained from being propelled into the passenger cabin.

9 Claims, 2 Drawing Sheets

RETAINING DEVICE FOR A PANELING ELEMENT COVERING AN AIRBAG ARRANGEMENT

FIELD OF THE INVENTION

The present invention relates generally to air bags used as occupant protection in motor vehicles and more specifically relates to a retaining device for the paneling elements covering and associated with an airbag arrangement.

BACKGROUND OF THE INVENTION

It is generally known to place airbags in motor vehicles behind a covering that can swing open. The covering may be made in the form of paneling elements which separate completely from an inside paneling which covers the airbag arrangement when the air bag is unfolded. A retaining strap attached to the paneling element limits the movement of the paneling element so that it may not be hurled into the passenger cabin in an uncontrolled manner as it separates.

In order to achieve optimum passenger protection in case of an accident, lateral or side airbags are also known and can be installed on the interior paneling above the side windows on the inside at the edges near the roof. In this case the typical interior paneling is designed so that when the lateral or side airbag is released the paneling bends and opens in order to provide an exit opening for this lateral airbag. The paneling elements as well as the folded airbags that are stared behind them can be attached to the lateral columns of the frame of a motor vehicle.

U.S. Pat. No. 5,403,034 discloses a retaining device for a paneling element of the interior paneling of a motor vehicle that covers an airbag arrangement, whereby the paneling element comes loose from the retaining device as the airbag unfurls and thus enables the airbag to unfold freely in case of an accident. The retaining device is provided with a holding element in the form of an elastic clamp that is detachably attached to the frame of the motor vehicle and with a holding element connected to the elastic clamp that holds the paneling element in a detachable manner.

In practice in this design, the paneling element is provided with a projection at the free end of which a groove-shaped channel is provided. The thicker free end of a ridge-like holding element that fits into the channel is seated in an approximately interlocking manner in the channel. The whole assembly can be snapped in a detachable manner into a bracket on the vehicle via this elastic clamp. In case of an airbag activation, the inflating airbag exerts pressure and thereby a lifting force upon the paneling element whereby the paneling element is pulled off the thicker end of the holding element as the channel sides are being spread wider. During this pulling-off event the holding element remains firmly connected to the elastic clamp, since in this design corresponding flexible tongues engage the walls of an opening on the holding element. The elastic clamp can be compressed to replace the holding element together with the elastic clamp.

It is a disadvantage with this design that a danger exists that the paneling element may be projected in an uncontrolled manner into the passenger cabin as it becomes detached. In addition, a connection that is relatively difficult to open is created by clamping the thicker end in the channel so that it can slip off only under strong pressure; and, as a result, the inflation process may possibly be hindered and delayed in an undesirable manner with such a design so that the reliability of the retaining device can, in turn, be impaired.

German Patent 43 15 853 A1 discloses a design in which a paneling element can be installed only when a locking element holding a retaining strap has been properly installed. For this purpose a sensor is provided on the paneling element that is prevented from being pushed in as long as the locking element is not snapped into the spreading body. In this design the retaining strap is made in one piece with the locking element and its manufacture is expensive.

Another design with a retaining strap is disclosed in European patent 0 415 362 A2 in which a paneling element covering an airbag exit opening is divided in two in its center, and is attached to the vehicle structure via shear elements. When the airbag unfurls in case of an accident the shear elements between the paneling element and the vehicle structure are shorn off, so that the halves of the individual paneling element can be swivelled away from the air bag exit opening, and retaining straps prevent uncontrolled hurling of the paneling element halves. The retaining straps are expensive in that they are attached, in this design, via screw connections to an airbag chamber housing on the one hand and to one of the two paneling element halves of the paneling element on the other hand.

European Patent Publication No. 0 873 916 A1 furthermore discloses a retaining device in which an elastic clamp is snapped into a frame element, whereby the paneling element is secured in this case by means of a retaining strap. One end of the retaining strap passes through an opening on one leg of the elastic clamp and then continues in a loop. To form the loop the free end of the retaining strap must be secured in an expensive welded or riveted connection to the retaining strap.

Accordingly, It is an object of this invention to create an alternative retaining device for a paneling element of the interior paneling of a motor vehicle which covers an airbag arrangement that is highly reliable and is also readily and inexpensively constructed and is easy to assemble and disassemble, and averts the danger to passengers created by the detaching paneling element during airbag activation is averted.

SUMMARY OF THE INVENTION

The foregoing object is attained through the invention described and claimed herein.

In one aspect of the invention, a retaining strap limiting the movement of the paneling element is provided; and, the strap is attached, on the one hand, on the paneling element and, on the other hand, is provided with a hole through which an elastic or resilient clamp extends and is attached in a detachable manner to the frame of the motor vehicle. As a result, the retaining strap is secured by the holding element on the elastic clamp.

A design of the above type advantageously ensures that no parts of the retaining device can be projected in an uncontrolled manner into the passenger cabin in case of an accident since they are held back by the retaining strap. A design of this type makes it possible to achieve an especially simple attachment of the retaining strap to the elastic clamp, since it need merely be slipped into the orifice or hole on the strap. In its assembled state the retaining strap is secured in a quite simple and secure manner against being lifted off by the holding element that is already connected to the elastic clamp. Thereby the retaining strap as well as the other components can be connected very easily to each other by snap or similar connections and can be again disconnected from each other in a non-destructive manner without the need to establish and/or disconnect connections such as expensive screw connections or even non-detachable connections such as rivet and/or welded connections and/or integral connections. The paneling element can thus be assembled as well as disassembled quickly and easily when required, together with the retaining device attached to it.

A design of this type also allows most advantageously for an integration of parts and functions in that the holding element has a triple function by holding the paneling element on the vehicle frame on the one hand, securing the holding band on the other hand and also making it possible to attach the elastic clamp. The elastic band advantageously also has a multiple function by holding the retaining strap in place on the one hand and to hold the retaining device in place on the vehicle frame on the other hand.

The holding element attached by means of the elastic clamp is furthermore attached to the paneling element in such manner that the connection between holding element and paneling element is released when the airbag is activated. The release of the connection between the holding element and the paneling element can advantageously be effected in that holding brackets which hold the paneling element are bent open and thus release the paneling element as a result of the pressure acting on the paneling element when the airbag is activated. This also ensures that no parts of the retaining device are projected into the passenger cabin in case of an accident.

PREFERRED EMBODIMENT

The holding element is preferably provided with a dimensionally stable holding plate by means of which the retaining strap attached to the paneling element is secured on the elastic clamp. In order to attach the holding band to the elastic clamp, only a hole made in the retaining strap is needed, through which the elastic clamp passes. The holding plate on the holding element can furthermore constitute a contact surface for the paneling element on which it is supported in the attached position.

The retaining device is designed preferably in such manner that the holding element is attached to the upper end of the mounting element that can be introduced into an installation opening or equivalent on the frame. The holding element and the elastic clamp can be formed easily and economically from steel sheet blanks, whereby the formed steel sheet parts can be combined without additional fasteners.

The holding element made in one piece of steel sheet is preferably a hoop-shaped holding plate with lateral holding brackets and with holding brackets projecting on the sides, above, spaced apart and parallel to these holding brackets, whereby the holding brackets engage the paneling element in a detachable manner. The retaining device designed in this manner fixes the paneling element in the desired attached position on the frame of a motor vehicle and allows for the detaching of the paneling element in case of an accident, preferably in that the holding brackets are bent open when the airbag is activated.

The preferred embodiment furthermore provides for the elastic clamp to be made in one piece of bent sheet steel that has an attachment zone that can be compressed elastically and enters the installation opening on the frame. The attachment device in the form of an elastic clamp can be introduced very simply into an installation opening until the attachment zone of the attachment device snaps in elastically at the edge of the installation opening.

The connection between the holding element and the elastic clamp can be effected in that end segments are provided on the elastic clamp and are bent horizontally relative to each other and overlap the holding element.

The retaining device is in particular designed for the attachment of paneling elements that cover lateral airbags and become detached when a lateral bag unfurls from its attachment. The retaining device can, however, also be used at other points of the interior paneling to attach airbag covers.

The invention is explained in further detail through the example of an embodiment shown in the drawings.

DESCRIPTION OF THE DRAWINGS

In the drawings appended hereto and made a part of this specification.

DETAILED DESCRIPTION

Figure 1:
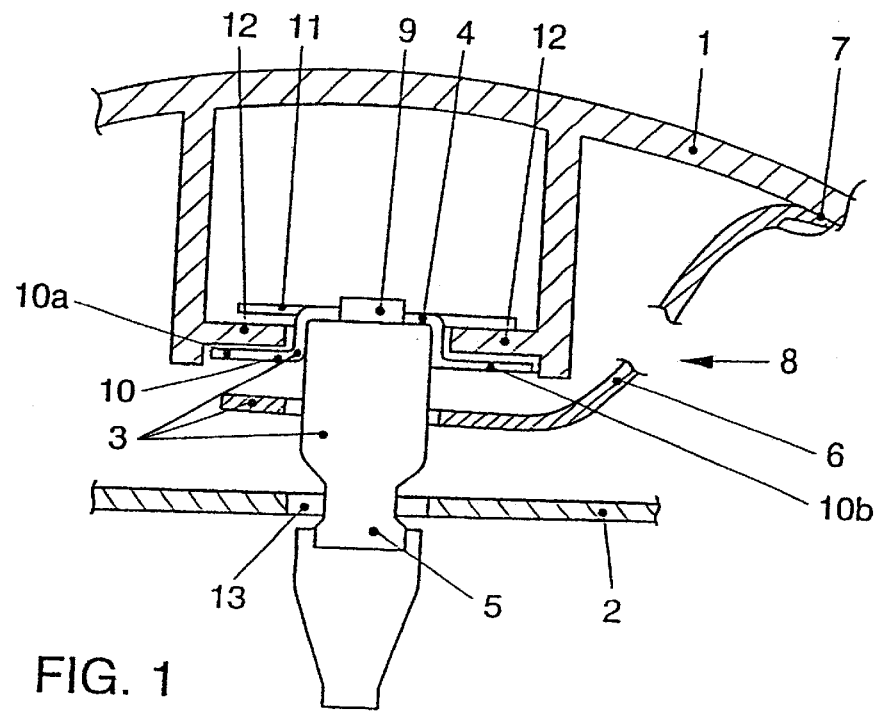
FIG. 1 shows a retaining device in partial section with a paneling element attached to the frame of a motor vehicle.

In FIG. 1, a portion of the paneling element 1 and a section of a column 2 of the frame of a motor vehicle are shown in a cross-section. The paneling element is attached in a detachable manner to column 2 by means of retaining device 3.

The retaining device 3 consists of a holding element 4, an elastic clamp 5 and a retaining strap 6 attached to the elastic clamp 5. The retaining strap 6 is connected on the other side with the paneling element 1 by means of a welding point 7. The interruption 8 drawn on the retaining strap 6 indicates a loop provided in this case which is sized so that sufficient freedom of movement is afforded for the paneling element 1 when this paneling element 1 becomes detached as shown in FIG. 2.

Figure 5:
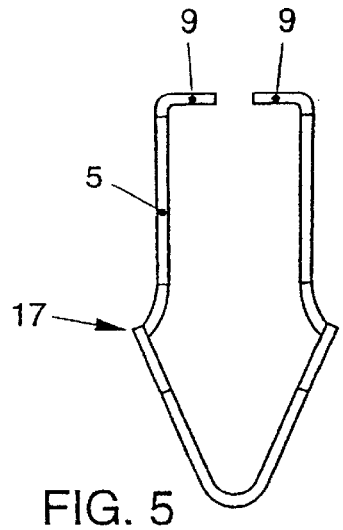
Figure 8:
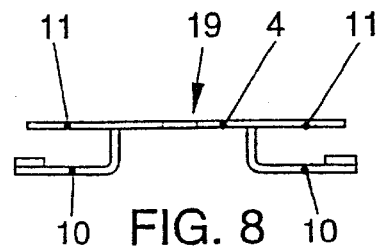
Figure 6:
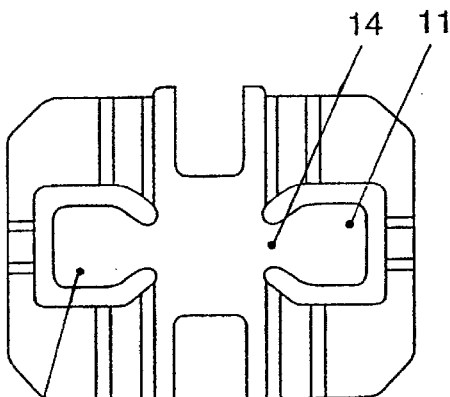
FIG. 6 shows a sheet steel blank for the holding element of the retaining device shown in FIG. 1.
Figure 7:
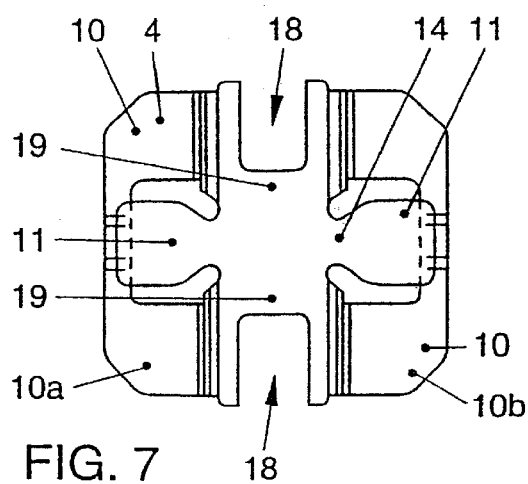
FIG. 7 is a top view of the holding element formed from the blank of FIG. 6; and, FIG. 8 is a lateral view of the holding element of FIG. 7.

The holding element 4 that is shown in detail in FIGS. 6 to 8 is overlapped by the attachment element in the form of an elastic clamp 5. For this purpose the elastic clamp 5 is provided on its upper end with horizontally bent segments 9, the design of which is especially well visible in FIG. 5.

The holding element 4 is a formed part made in one piece of sheet steel comprising a hoop-shaped holding plate 10 with lateral holding brackets 10a, 10b, parallel to and spaced apart from holding brackets 11. The attachment ridges 12 of the paneling element 1 enter the space between the holding brackets 11 and the holding brackets 10a, 10b. The elastic clamp 5 snaps elastically or resiliently into an installation opening 13 in the column 2 so that the paneling element 1 is thereby fixed on the column 2.

Figure 2:
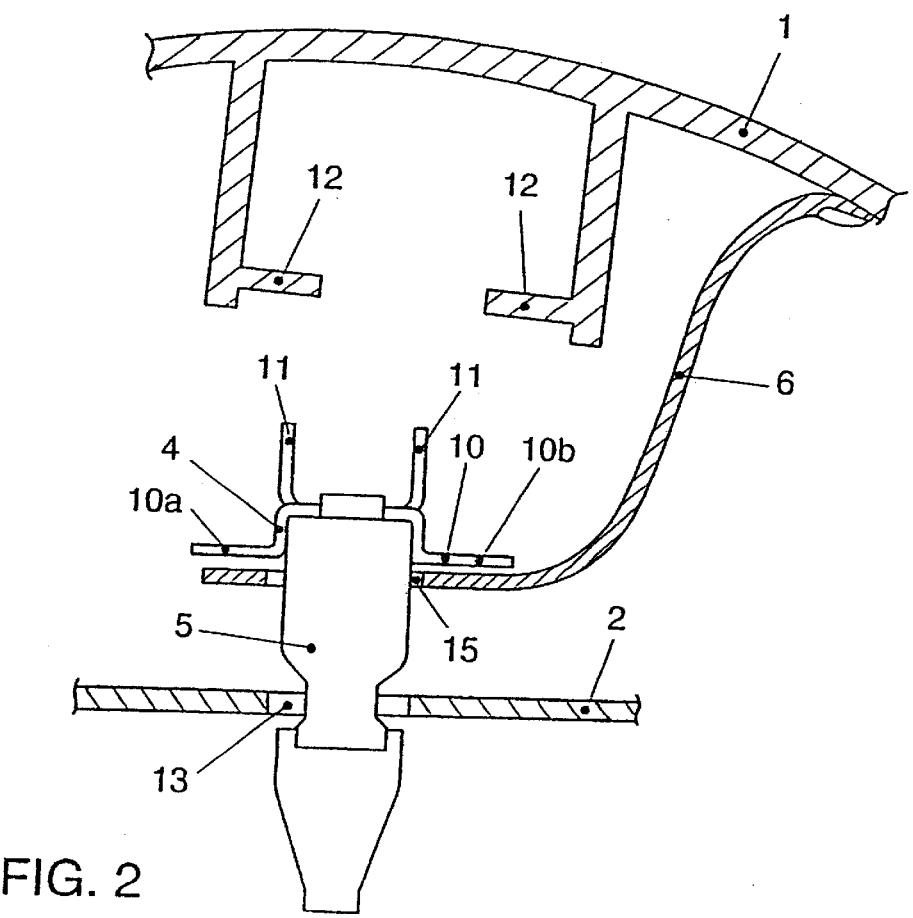
FIG. 2 shows the retaining device of FIG. 1 where the paneling element has become detached in an accident.

The holding brackets 11 are sized so that they are able to bend open when an airbag located beneath the paneling element 1 is activated, as shown in FIG. 2. The holding brackets 11 can be made with suitably thin sides for this purpose and/or can be connected to the hoop-shaped holding plate 10 by a suitably narrow connection ridge. Such a connection ridge 14 can be seen on either of the two holding brackets 11 on the blank shown in FIG. 6.

FIG. 2 shows furthermore that the retaining strap 6 is secured to the elastic clamp 5 by means of the holding plate 10 of the holding element 4. The elastic clamp 5 extends through a hole 15 in the retaining strap 6.

Figure 3:
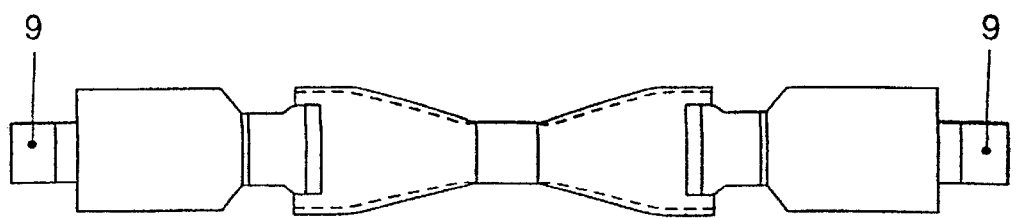
FIG. 3 shows the sheet steel blank for the forming of an elastic clamp that constitutes the attachment element of the retaining device of FIG. 1.
Figure 4:
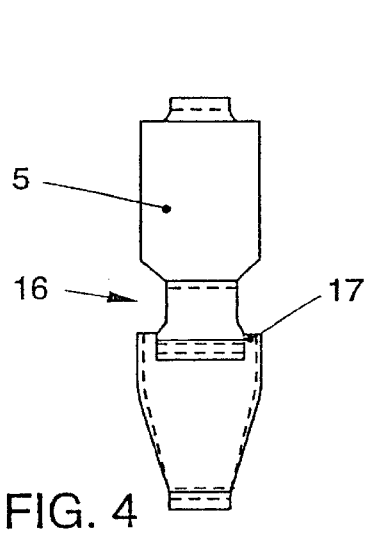
FIGS. 4 and 5 show two views rotated by 90° of an elastic clamp formed from the blank of FIG. 3.

The blank shown in FIG. 3, for the attachment element in form of the elastic clamp 5 shows the cutting and bending lines. At both ends are the end segments 9 which are bent at an angle towards each other in the elastic clamp 5 as shown in FIGS. 4 and 5. The elastic clamp 5 has furthermore a thin area constituting a mounting zone 16 in the center. When the elastic clamp 5 is inserted into the installation opening 13 as shown in FIG. 2, laterally projecting mounting edges 17 reach under the opening edge of the installation opening 13. Compression of the clamp-shaped mounting element 5 makes it possible to pull the latter back out of the installation opening 13.

The holding element 4 shown in FIGS. 7 and 8 can be formed from the sheet steel blank shown in FIG. 6. The elastic clamp 5 of FIG. 5 is mounted on the holding element 4 in such manner that the end segments 9 (FIG. 5) overlap the holding element 4 from the two lateral openings 18 on the edge zones 19.

The foregoing described invention is limited only by the scope of the claims below:

1. A retaining device for use in connection with an airbag arrangement in a motor vehicle which has a frame (2) and interior panelling, said retaining device comprising:
   a) a panel element (1) covering an unfurled airbag in said arrangement;
   b) a mounting element made in the form of an elastic clamp (5) which is attached to said frame (2);
   c) a holding element (4) connected to the elastic clamp (5) which holds said panel element (1) in a detachable manner whereby upon activation an unfurled airbag in said arrangement may freely unfurl as said panel element detaches;
   d) a retaining strap (6) for limiting the movement of panel element (1) when detached, said strap (6) being attached to element (1) on one end and on the other end is provided with a hole (15) through which the elastic clamp (5) extends, said strap (6) being secured by holding element (4) on the elastic clamp (5) whereby upon activation said panel element (1) detaches and swings aside, said strap restraining the panel element.

2. The retaining device of claim (1), wherein the holding element (4) engages the panel element (1) by means of deformable holding brackets.

3. The retaining device of claim 2, wherein holding element (4) includes a dimensionally stable holding plate (10) for securing said strap ( 6) on the elastic clamp (5).

4. The retaining device of claim 3, including an installation opening (13) on said motor vehicle frame and wherein the holding element (4) is attached on the upper end of the elastic clamp (5) for insertion into said installation opening (13).

5. The retaining device of claim 4, wherein the holding element (4) is a one-piece formed part made of sheet steel which engages the paneling element (1); holding plate (10) is in the form of a hoop shape and includes lateral holding brackets (10a), (10b); and laterally protruding holding brackets (11) are spaced at a distance above and parallel to said plate (10).

6. The retaining device of claim 5, wherein the elastic clamp (5) is a bent clamp made in one piece of spring steel and includes a mounting zone (16) which can be compressed elastically and to be restrainably engaged in installation opening (13).

7. The retaining device of claim 6, wherein the clamp (5) overlaps the holding element (4) and including end segments (9) bent at an angle and aligned with each other.

8. The retaining device as in claim 7, wherein a panel element (1) when mounted on the frame of a motor vehicle can be disassembled non-destructively by compressing the clamp.

9. The retaining device of claim 1 wherein said paneling is column-shaped and mounted on the frame of said motor vehicle to cover a lateral airbag.

* * * * *